(12) United States Patent
Foessel et al.

(10) Patent No.: US 12,542,869 B2
(45) Date of Patent: Feb. 3, 2026

(54) VIDEO CONFERENCE APPARATUS, VIDEO CONFERENCE METHOD AND COMPUTER PROGRAM USING A SPATIAL VIRTUAL REALITY ENVIRONMENT

(71) Applicant: Fraunhofer-Gesellschaft zur Förderung der angewandten Forschung e.V., Munich (DE)

(72) Inventors: Siegfried Foessel, Erlangen (DE); Angela Raguse-Foessel, Erlangen (DE)

(73) Assignee: Fraunhofer-Gesellschaft zur Foerderung der angewandten Forschung e.V, Munich (DE)

( * ) Notice: Subject to any disclaimer, the term of this patent is extended or adjusted under 35 U.S.C. 154(b) by 0 days.

(21) Appl. No.: 17/175,335

(22) Filed: Feb. 12, 2021

(65) Prior Publication Data

US 2022/0264055 A1   Aug. 18, 2022

(51) Int. Cl.
*H04N 7/15* (2006.01)
*G06T 15/20* (2011.01)
(Continued)

(52) U.S. Cl.
CPC .......... *H04N 7/157* (2013.01); *G06T 15/205* (2013.01); *G06T 19/006* (2013.01); *H04N 7/152* (2013.01); *H04N 23/69* (2023.01)

(58) Field of Classification Search
CPC .......... H04N 7/157; H04N 7/15; H04N 7/147; H04N 23/69; H04N 7/152; G06T 19/006; G06T 15/205
See application file for complete search history.

(56) References Cited

U.S. PATENT DOCUMENTS 4,400,724 A * 8/1983 Fields ................. H04L 12/1827
                                                  348/E7.083
6,285,392 B1 * 9/2001 Satoda ..................... H04N 7/15
                                                  348/E7.083
(Continued)

FOREIGN PATENT DOCUMENTS

JP          2006279588 A      10/2006
JP          2018074294 A       5/2018
(Continued)

OTHER PUBLICATIONS https://ibc2020.digitalmedia.fraunhofer.de; retrieved from the Internet May 25, 2021, 2021.
(Continued)

*Primary Examiner* — Patrick F Riegler
(74) *Attorney, Agent, or Firm* — PERKINS COIE LLP; Michael A. Glenn

(57) ABSTRACT

A Video conference apparatus (100) is configured to reproduce videos (110a,110b) of a plurality of video conference participants on a plurality of video reproduction areas (120a, 120b; 220a-220c; 420a-420d; 470a-470h) or video reproduction spaces that are arranged in a spatial virtual reality environment (120; 200; 300; 400; 450). The video conference apparatus is configured to render the spatial virtual reality environment (120; 200;300;400;450) with the video reproduction areas (120a,120b; 220a-220c; 420a-420d; 470a-470h) or video reproduction spaces to a total image (112) for a single video conference participant. A video conference method and a computer program are also disclosed.

20 Claims, 5 Drawing Sheets

(51) Int. Cl.
*G06T 19/00* (2011.01)
*H04N 23/69* (2023.01)

(56) References Cited

U.S. PATENT DOCUMENTS

| | | | |
|---|---|---|---|
| 8,223,186 B2 | 7/2012 | Derocher et al. | |
| 8,976,224 B2* | 3/2015 | Smith | H04N 7/15 348/14.09 |
| 9,007,422 B1* | 4/2015 | Kwon | H04N 7/157 348/14.09 |
| 9,338,404 B1* | 5/2016 | Egeler | H04N 7/157 |
| 9,584,653 B1* | 2/2017 | Lyren | G06F 3/04842 |
| 10,678,323 B2* | 6/2020 | Gibson | G06T 15/20 |
| 10,701,318 B2* | 6/2020 | Valli | G06T 19/006 |
| 10,733,781 B2* | 8/2020 | Shenton | A63F 13/215 |
| 10,841,537 B2* | 11/2020 | Valli | H04L 65/403 |
| 11,050,973 B1* | 6/2021 | Faulkner | H04M 3/567 |
| 11,086,474 B2* | 8/2021 | Lee | G06F 3/167 |
| 11,196,963 B1* | 12/2021 | DiPasquale | H04L 65/403 |
| 11,380,039 B2* | 7/2022 | Miller, IV | G06F 3/011 |
| 11,792,367 B2* | 10/2023 | Oz | G06F 3/011 348/14.08 |
| 11,870,939 B2* | 1/2024 | Gronau | H04L 65/403 |
| 12,112,011 B2* | 10/2024 | Smith | G06F 3/04845 |
| 2007/0279484 A1 | 12/2007 | Derocher et al. | |
| 2009/0033737 A1* | 2/2009 | Goose | H04N 7/15 348/E7.083 |
| 2009/0254843 A1* | 10/2009 | Van Wie | H04L 67/131 707/999.005 |
| 2010/0085416 A1 | 4/2010 | Hegde et al. | |
| 2011/0078591 A1 | 3/2011 | Van et al. | |
| 2013/0024785 A1* | 1/2013 | Van Wie | H04M 3/567 715/753 |
| 2013/0076853 A1* | 3/2013 | Diao | H04N 7/157 348/E7.083 |
| 2013/0182064 A1* | 7/2013 | Muench | H04M 3/568 379/202.01 |
| 2013/0219302 A1* | 8/2013 | Tytgat | G06T 19/00 715/757 |
| 2013/0321564 A1* | 12/2013 | Smith | G06T 15/205 348/14.08 |
| 2014/0009562 A1 | 1/2014 | Hegde et al. | |
| 2014/0115502 A1* | 4/2014 | Van Wie | H04N 7/157 709/204 |
| 2014/0132630 A1* | 5/2014 | Mun | H04N 21/42203 345/633 |
| 2014/0232816 A1* | 8/2014 | Wilson | G06F 3/011 348/14.08 |
| 2015/0063553 A1* | 3/2015 | Gleim | H04N 7/15 379/202.01 |
| 2015/0109405 A1* | 4/2015 | Skramstad | H04N 5/265 348/14.08 |
| 2015/0195489 A1* | 7/2015 | Sobti | H04N 7/142 348/14.08 |
| 2015/0213650 A1 | 7/2015 | Barzuza et al. | |
| 2015/0215581 A1* | 7/2015 | Barzuza | H04L 65/4038 348/14.1 |
| 2015/0244976 A1* | 8/2015 | Chen | H04N 7/142 348/14.07 |
| 2015/0271448 A1* | 9/2015 | Kleiner | H04N 7/15 348/14.07 |
| 2015/0281649 A1* | 10/2015 | Ehmann | G06F 3/1454 348/14.07 |
| 2016/0227172 A1* | 8/2016 | Safaei | G06T 19/006 |
| 2017/0032570 A1* | 2/2017 | Bear | H04N 7/157 |
| 2017/0237941 A1* | 8/2017 | Vats | H04N 5/2628 348/14.07 |
| 2017/0339372 A1* | 11/2017 | Valli | G06T 15/005 |
| 2018/0033203 A1* | 2/2018 | Ligameri | G06F 3/1454 |
| 2018/0098059 A1* | 4/2018 | Valdivia | G06F 3/0481 |
| 2019/0108683 A1* | 4/2019 | Valli | G06T 19/003 |
| 2019/0215464 A1 | 7/2019 | Kumar et al. | |
| 2019/0215486 A1* | 7/2019 | Venshtain | G06T 17/20 |
| 2019/0253667 A1* | 8/2019 | Valli | H04N 13/243 |
| 2019/0313059 A1* | 10/2019 | Agarawala | G06F 3/011 |
| 2020/0197825 A1* | 6/2020 | Bear | A63F 13/5255 |
| 2020/0319704 A1* | 10/2020 | Kathuria | G06F 1/163 |
| 2021/0006749 A1* | 1/2021 | Koike | G06F 3/1454 |
| 2021/0044779 A1* | 2/2021 | Prins | H04L 12/1827 |
| 2021/0368136 A1* | 11/2021 | Chalmers | G06F 3/0346 |
| 2022/0021845 A1* | 1/2022 | Schneider | H04L 12/1827 |
| 2022/0103963 A1* | 3/2022 | Satongar | H04N 7/147 |
| 2022/0182581 A1* | 6/2022 | Oz | H04N 7/157 |
| 2022/0198758 A1* | 6/2022 | Laaksonen | H04L 12/1818 |
| 2022/0264055 A1* | 8/2022 | Foessel | H04N 23/69 |
| 2023/0101902 A1* | 3/2023 | El Essaili | H04W 4/80 715/757 |
| 2024/0015263 A1* | 1/2024 | Azuma | G06T 15/50 |

FOREIGN PATENT DOCUMENTS

| | | |
|---|---|---|
| WO | 2017098999 A1 | 6/2017 |
| WO | 2018005235 A1 | 1/2018 |
| WO | 2018039071 A1 | 3/2018 |

OTHER PUBLICATIONS

P. Kauff et al.: "An immersive 3D video-conferencing system using shared virtual team user environments", CVE 2002. Bonn, Germany, Sep. 30-Oct. 2, 2002; [Proceedings of the 4th International Conference on Collaborative Virtual Environments], NY: ACM, US, Sep. 30, 2002, pp. 105-112, XP058252738.

* cited by examiner

# VIDEO CONFERENCE APPARATUS, VIDEO CONFERENCE METHOD AND COMPUTER PROGRAM USING A SPATIAL VIRTUAL REALITY ENVIRONMENT

TECHNICAL FIELD

Embodiments according to the invention are related to a video conference apparatus.

Further embodiments according to the invention are related to a video conference method.

Further embodiments according to the invention are related to a computer program for performing a video conference method.

Generally speaking, embodiments according to an invention are related to a concept for implementing roundtable video conferences.

BACKGROUND

Video conference systems are currently experiencing increasing popularity. In particular, in the era of the Corona Pandemic, video conference systems are experiencing increasing popularity.

In such applications, the video streams of the participants are nowadays mostly represented as individual tiles on the screen. If the number of participants is too large, they are partly not presented, or the perception changes depending on the current speaker.

An example of a video conference is shown in FIG. 5.

Microsoft has announced the "together mode" in TEAMS. Here, the participants are tied to fixed seats, like in a seminar room. However, this is also only a planar arrangement. An example is shown in FIG. 6.

In view of this situation, there is a desire to create a concept to which provides for an improved user experience when participating in a video conference.

SUMMARY

An embodiment according to the invention creates a video conference apparatus. The video conference apparatus is configured to reproduce videos of a plurality of video conference participants on a plurality of video reproduction areas or video reproduction spaces that are arranged in a spatial (e.g. three-dimensional or spatially three-dimensional) virtual reality environment. The video conference apparatus is configured to render the spatial (e.g. three-dimensional) virtual reality environment with the video reproduction areas and/or video reproduction spaces (e.g. from the perspective of a virtual camera at a virtual camera position) to a total image (or overall image), e.g. for a particular (or single, or individual) video conference participant (e.g. an observer) (e.g. as seen by a virtual camera (122) representing the conference participants view).

A video reproduction area is typically the surface of a monitor or a canvas in the cinema, in this context it is a virtual reproduction screen. A video reproduction space is a set of 3D data with position and lightfield/image texture information, typically from a scene captured by multiple cameras and/or 3D sensors, processed and represented as point cloud, multi-view image or lightfield data. A video reproduction space can provide different views and depths information for the captured objects or scene by a renderer.

This embodiment according to the invention is based on the idea that an improved user experience in the video conference can be provided by reproducing videos of a plurality of video conference participants on a plurality of video reproduction areas or on or in video reproduction spaces (or video reproduction rooms) that are arranged in a virtual reality environment and for rendering the spatial virtual reality environment with the video reproduction areas or video reproduction spaces to obtain a total image (or overall image) for a certain (or single, or individual) video conference participant. It has been found that the rendering of videos of a plurality of video conference participants in a spatial virtual reality environment provides a video conference participant who looks at the rendered total image or overall image, for a much better feeling of involvement when compared to a conventional tile arrangement. In particular, it has been found that the video conference participant has the possibility to focus on those (one or more) video conference participants which are currently of interest for him and to give him an impression which is similar to an impression gained from participating in a real on-site conference.

For example, the arrangement of the video reproduction areas and/or the video reproduction spaces in a spatial virtual reality environment allows the video conference participant to select his viewpoint and/or his viewing direction and/or his focus (e.g. in the sense of a zooming). Moreover, it has also been found that a placement of the video reproduction areas and/or video reproduction spaces at "natural" locations within a three-dimensional scene (rather than as flat tiles in a rectangular grid) makes a video conference more realistic and therefore often more fruitful. In contrast, the conventional "flat tile" format has been found to be confusing and tiring for many people, so that concentration is often lost relatively fast using conventional approaches.

To conclude, a reproduction of videos of a plurality of video conference participants on a plurality of video reproduction areas or video reproduction spaces that are arranged in a spatial virtual reality environment, and a rendering of the spatial virtual reality environment with the video reproduction areas or video reproduction spaces allows to have a significantly improved user experience and further facilitates a user interaction (for example, selecting a desired view), which helps to reduce a loss of concentration.

In preferred environment, the video reproduction areas or video reproduction spaces are oriented differently (e.g. comprise different spatial orientations, or are located in different non-parallel planes). By choosing different orientations for different video reproduction areas and/or for different video reproduction spaces, the "spatial" impression of a video conference participant can be improved. Moreover, by rendering the videos of different video conference participants on video reproduction areas or on or in video reproduction spaces having different orientations, "natural" user interactions, like a change of the viewing direction, result in a change of the overall image (or total image) available for a given video conference participant which is well in agreement with his "natural" expectation. Thus, it can be achieved that a user experience is more natural and less tiring when compared to conventional video conference systems.

In a preferred embodiment, the video conference apparatus is configured to adjust an observer position (e.g. a position of a virtual camera) depending on a user input. The video conference apparatus is also configured to render the spatial (three-dimensional) virtual reality environment with the video reproduction areas and/or video reproduction spaces depending on the observer position, for example, so as to obtain a two-dimensional image of the spatial, or a three-dimensional, virtual reality environment with the video reproduction areas and/or video reproduction spaces from the perspective of an observer at the observer position. The user input can be a pressed key, an action on a computer mouse or even a rotation of the user's head or the change of the observed eye viewing direction of the user.

Accordingly, it is possible to render an image of the spatial virtual reality environment, with videos of a plurality of video conference participants included at the video reproduction areas and/or at or in the video reproduction spaces, from different perspectives (e.g. defined by the variable observer position). Thus, by having the possibility to adjust the observer position, the observer position may, for example, be adjusted in dependence on who is currently speaking and/or in dependence on users' preferences. Consequently, the spatial virtual reality environment can be rendered from variable observer positions, which allows to focus on the currently most relevant speakers and (possibly) their respective environment. Moreover, the change of the observer position may, for example, be comparable to a blending between different cameras in a TV studio, which may provide an impression to a video conference participant that he is familiar with. Accordingly, by adjusting the observer position, for example, depending on a user input (but, alternatively or in addition, in dependence on who is currently speaking) a positive user experience can be obtained.

In a preferred embodiment, the video conference apparatus is configured to adjust an observer viewing direction (e.g. a viewing direction of a virtual camera) depending on a user input, and to render the spatial (e.g. three-dimensional) virtual reality environment with the video reproduction areas or video reproduction spaces depending on the observer viewing direction. For example, the spatial virtual reality environment can be rendered so as to obtain a two-dimensional image of the spatial, or three-dimensional, virtual reality environment with the video reproduction areas or video reproduction spaces from the perspective of an observer at an observer position with a view into the observer viewing direction. By giving the video conference participant (who may be the observer) the possibility to adjust his observer viewing direction, the video conference participant may obtain a particularly realistic impression. For example, by allowing the adjustment of the observer viewing direction (which is considered in the rendering of the total image or overall image), the video conference participant is given the possibility to focus his attention on one or more other video conference participants (or videos from one or more other video conference participants) in a natural manner.

For example, the adjustment of the observer viewing direction may correspond to a rotation of the head of the video conference participant. Thus, the video conference participant may be given the impression that he is sitting in a common room, or sitting around a common table, together with the other video conference participants. Thus, an impression for a video conference participant will be particularly realistic and pleasant.

In a preferred embodiment, the video conference apparatus is configured to selectively render one or several video reproduction areas and/or one or several video reproduction spaces that are associated with other users depending on a user input. Accordingly, a user may select whether he or she currently wants to watch a video of just one other user (video conference participant) or videos of several other users (e.g. video conference participants) rendered on respective video reproduction areas and/or video reproduction spaces of the spatial, or three-dimensional, virtual reality environment.

Accordingly, a video conference participant has the possibility to "zoom in" onto a single other video conference participant, or he can "zoom out" to see video reproduction areas or video reproduction spaces showing videos of multiple other video conference participants. Consequently, the video conference participant is enabled to concentrate his attention onto a single other video conference participant (for example by "zooming in" in such a manner that he only sees a video of one other video conference participant, and possibly an environment of the video reproduction area or the video reproduction space associated with this one other video conference participant). However, the user also has the possibility to "zoom out" and to simultaneously have a view of a plurality of other video conference participants. Thus, the user is given the flexibility to selectively focus his attention to a single other video conference participant, when desired, and to observe multiple video conference participants in another situation.

Moreover, by having the video reproduction areas or video reproduction spaces, on which the videos of the plurality of video conference participants are displayed, arranged in a spatial virtual reality environment, a transition between a viewing of a single other video conference participant and a viewing of multiple other video conference participants can be performed in a visually pleasant manner, for example by zooming in and/or zooming out of the view and possibly by a (smooth) change of the observer position and/or observer viewing direction (which may be associated to the currently considered video conference participant for whom the rendering is performed).

In a preferred embodiment, the video conference apparatus is configured to arrange the video reproduction areas or video reproduction spaces along a contour (e.g. along a closed contour or a closed line). In this manner, it is, for example, possible to avoid overlaps (e.g. occlusion) between the video reproduction areas or video reproduction spaces associated with different video conference participants. Moreover, such an arrangement of the video reproduction areas or video reproduction spaces may well resemble a sitting order in many "real world" conference situations.

Furthermore, by arranging the video reproduction areas and/or video reproduction spaces along a contour may facilitate a choice of a variable observer position and/or observer viewing direction for a currently considered video conference participant, since the arrangement of the video reproduction areas or video reproduction spaces associated with different video conference participants may eliminate the need for a complex (e.g. three-dimensional) choice of the observer position. Rather, for example, a low number of parameters may be sufficient to select an observer position and/or an observer viewing direction to thereby select a desired view onto the videos of the other video conference participants if the respective video reproduction areas or video reproductions spaces are arranged along a contour. For example, a single (one-dimensional) movement parameter may be sufficient to describe a position along the contour, such that a very simple human interaction device for a user interface may be sufficient to select a currently considered video conference participant's observer position.

In a preferred embodiment, the video conference apparatus is configured to arrange the video reproduction areas or video reproduction spaces along a circle or along an oval or along a square or along a rectangle. By arranging the video reproduction areas and/or video reproduction spaces along such a shape, a "real life" conference environment may be modeled in which the video conference participants are sitting around a round or oval or square or rectangular table. Thus, a "natural" user experience can be achieved.

Moreover, by arranging the video reproduction areas and/or the video reproduction spaces along such a closed contour in a spatial virtual reality environment, a selection of an observer position and/or of an observer viewing direction can be done in a particularly easy and efficient manner, since, in many cases, it is sufficient to position the observer (i.e., the video conference participant for which the total image is rendered) on the contour or within an area bounded by the contour (e.g. circle or oval or square or rectangle). Accordingly, the user interface for inputting the observer position and/or the observer viewing direction can be simple, since a range of "reasonable" observer positions is typically limited by such a placement of the video reproduction areas or video reproduction spaces.

In a preferred embodiment, the video conference apparatus is configured to arrange (or to render) the video reproduction areas and/or video reproduction spaces at user locations (e.g. at seat locations; e.g. at seats of a table or around a table; e.g. at standing locations around a table or around a counter) in the spatial (or three-dimensional) virtual reality environment. Accordingly, the virtual reality environment reflects a typical actual conference environment and therefore brings along a very advantageous user impression. In particular, the video reproduction areas or video reproduction spaces, on which the videos of the other video conference participants are displayed (or rendered) (e.g. as a texture) are located in accordance with a user's expectation which arises from his experience of "real life" conferences. Thus, the video conference apparatus provides the video conference participant with a "look and feel" that is similar to an "in house" conference. This helps to improve the user's impression and to maintain his concentration.

In a preferred embodiment, the video conference apparatus is configured to obtain (e.g. from a user and/or via a user input and/or from a user interface) one or several observation parameters (e.g. an observation point parameter or a "viewpoint" parameter and/or a rotation angle and/or a zoom factor) and to render the spatial (e.g. three-dimensional) virtual reality environment with the video reproduction areas or video reproduction spaces depending on the one or several observation parameters. By giving the user (e.g. the video conference participant) the possibility to input one or several observation parameters via a user interface, the user can adapt his view onto the spatial virtual reality environment to his expectations. Thus, the user can, for example, determine his observer position and/or his observer viewing direction, and therefore can decide which one or more other video conference participants he wanted to focus on. The one or more observation parameters could be obtained in several manners. For example, the user could input the one or more observation parameters using a (manual) user interface (e.g. using a touchscreen or using keys, or using a pointing device like a computer mouse). Alternatively, the one or more observation parameters could also be derived from a user's movement, from a user's viewing direction, from a user's position, and so on. Different technical means, like a position tracker, an eye tracker, a head tracker, or the like could be applied to obtain the one or more observation parameters on the basis of a motion of a video conference participant. Thus, the video conference participant can manually or automatically adapt the one or more observation parameters in accordance with his needs.

In a preferred embodiment, the observation parameters include a rotation angle (e.g. a rotation angle of an observer, or of an observer camera, or of a virtual camera, e.g. located at a center of the virtual reality environment or at a center around which the reproduction areas or video reproduction spaces are arranged) and/or a zoom factor. By using a rotation angle as an observation parameter, a viewing direction of a virtual camera (and possibly also a position of the virtual camera) can be determined easily.

For example, the rotation angle can define a viewing direction of the virtual camera, from the perspective of which the total image (or overall image) is generated. However, the rotation angle may also define a position of said virtual camera, for example if the position of the virtual camera (which may be equal to an observer position) is adapted to move along a predetermined line, or even along a predetermined closed contour (like a circle or an oval or a square or a rectangle). However, the rotation angle may, optionally, at the same time define a viewing direction of the virtual camera (and therefore an observer viewing direction) and a position of the virtual camera (and therefore, at the same time, an observer position). This is due to the fact that the viewing direction of the virtual camera (or, equivalently, the observer viewing direction) may be related to the position of the virtual camera (or, equivalently, to the observer position) since, for example, for each position of the virtual camera there may be an associated viewing direction of the virtual camera (e.g. towards a center of a contour along which the virtual camera is movable).

To conclude, a rotation angle is a very efficient observation parameter since it may well define an observer position and/or an observer viewing direction in the form of a single scalar value, that can easily be obtained from a user interface.

Moreover, it has been found that a zoom factor also constitutes a very efficient observation parameter, since the usage of a zoom factor allows the user (video conference participant) to select between a focusing on a single other video conference participant and a "wide view" comprising videos of a plurality of different other video conference participants.

In a preferred embodiment, the video conference apparatus is configured to render, with an adjustable viewing direction and/or an adjustable zoom factor, the spatial (or three-dimensional) virtual reality environment with the video reproduction areas or video reproduction spaces viewed from a predetermined (e.g. fixed) observation point (e.g. viewed from a center of the virtual reality environment, or viewed from a center around which the video reproduction areas or video reproduction spaces are arranged). For example, the rendering may be such that a user may select the viewing direction and/or the zoom factor and, for example, may therefore select which other video conference participants' video input is in his field of view, or how many video conference participants' video input is in his field of view.

It has been found that a rendering of the spatial virtual reality environment viewed from a predetermined (e.g. fixed) observation point allows for a particularly simple user control, since it is not necessary to adjust the observation point. Moreover, it has been found that it is nevertheless possible for the user (video conference participant) to select a desired view by inputting (for example, via a user interface) a selection of a viewing direction and/or a selection of a zoom factor. Both the selection of the viewing direction and the selection of the zoom factor may be performed using simple input means, since both a viewing direction information and a zoom factor information are typically one-dimensional information only. Furthermore, it has been found that the usage of a fixed predetermined observation point is well in agreement with a user experience in an on-site conference, where the conference participant is typically stationary (e.g. seated on his seat). Accordingly, such a type of control brings about a particularly good user experience.

Regarding this issue, it should be noted that the different choices of the predetermined observation point are possible. The predetermined observation point could, for example, be at a center of the virtual reality environment, or at a center around which the video reproduction areas or video reproduction spaces are arranged. Alternatively, however, the predetermined observation point could also be on (or close to) a contour (e.g. a circle, or an oval, or a square, or a rectangle) along which the video reproduction areas or video reproduction spaces are arranged (which may, for example, correspond to a seat placed at a table). However, it has been shown that both selections of the predetermined observation point provide good user experience.

In a preferred embodiment, the video conference apparatus is configured to render the spatial (or three-dimensional) virtual reality environment with the video reproduction areas or the video reproduction spaces viewed from a variable observation point (and optionally also with an adjustable viewing direction and/or an adjustable zoom factor). The variable parameter or the variable observation point is determined, for example, by one of the observation parameters.

This embodiment is based on the finding that it is advantageous for some users to have a variable observation point even though this deviates from a normal situation in an on-site conference. By rendering the spatial virtual reality environment with the video reproduction areas and/or the video reproduction spaces viewed from a variable observation point, it can be achieved that every conference participant's video is well visible for the video conference participant for which the rendering is performed. For example, it may be advantageous to change the observation point when another video conference participant, who is (virtually) seated relatively far away from the video conference participant for which the virtual reality environment is rendered, is speaking.

While, in an on-site (real world) conference, another conference participant who is seated far away could be seen only from a large distance (and possibly not very clearly), by changing the observation point in such a situation a much better image of the "far away" video conference participant can be provided in the rendered "total image" or overall image.

Similarly, a change of the observation point may, for example, be particularly advantageous if another video conference participant, who is seated beside the video conference participant for whom the image is rendered, is speaking. While a "real world" conference participant would normally not have the chance to have a "front view" of his neighbor, when the neighbor is speaking to the plenum, this is possible by changing the observation point, i.e., by using a variable observation point. Accordingly, the impression can, in some situations, even be better than in an on-site conference. However, it should be noted that many other useful scenarios for the usage of a variable observation point are also possible.

In a preferred embodiment, the video conference apparatus is configured to adjust the variable observation point (e.g., a location of a virtual camera) depending on observation information (e.g., obtained via user interface) or depending on angle information (or rotation angle information), which may, for example, be obtained by a user interface. For example, the variable observation point may be adjusted (or adjustable) such that the observation point is selectable, or displaceable, by the user along a curve in the virtual reality environment (e.g., along a curve along which the video reproduction areas or video reproduction spaces are arranged).

By making the variable observation point adjustable depending on an observation information or depending on angle information (which may, for example, be provided by the user via a user interface), the user (video conference participant) may be given a large freedom to choose his "favorite" observation point. Thus, the rendered overall image or total image may be well adapted to the user's preferences.

In a preferred embodiment, the video conference apparatus is configured to adjust the variable observation point (e.g., a location of a virtual camera) depending on observation information (e.g., obtained via a user interface) or depending on angle information (or rotation angle information), which may be obtained via a user interface, such that the variable observation point is selectable or displaceable by the user (e.g., via the user interface) along a curve in the virtual reality environment (e.g., along a curve along which the video reproduction areas or video reproduction spaces are arranged).

By providing the possibility for the user to easily move the variable observation point along a curve (e.g., along a line), it is, for example, possible to have a predefined path (the curve) along which the variable observation point can be moved. Movement along this curve (which may be a predefined path) may then, for example, be controlled by a one-dimensional user input, since a position along a predetermined curve in the virtual reality environment can be defined by a single (one-dimensional) variable. Thus, the curve in the virtual reality environment can, for example, be predefined in such a manner that each point along said curve provides a good view of the three-dimensional (spatial) virtual reality environment.

Moreover, the video conference apparatus may be configured to adjust an observer viewing direction depending on the observer position information, for example so that the observer viewing direction that specifies a viewing direction in rendering is automatically adapted to an observer position.

Thus, for example, for each position along the (predefined) curve in the virtual reality environment, a corresponding observer viewing direction may be defined, such that it is not necessary for the user to choose the observation point and the observer viewing direction independently. Rather, a single (scalar) parameter, which is input via the user interface, may be sufficient to define both the variable observation point (which is movable along the predefined curve) and the observer viewing direction. For example, the relationship between the position along the (predefined) curve and observer viewing direction may be defined in such a manner that a good user experience is provided for each observation point along the curve.

Moreover, it should be noted that a movement along the predefined curve in the virtual reality environment may be quasi continuous, e.g., such that there is no "hard" switching between positions providing a substantially different rendered total image, or stepwise (such that, for example, each step provides a focus on another video reproduction area or video reproduction space).

To conclude, by jointly adjusting the variable observation point and the observer viewing direction on the basis of observer position information, a simple user control over the perspective of the rendered total image is provided, which helps to achieve a good user experience.

To further conclude, the embodiment provides a video conference apparatus, wherein the video conference apparatus is configured to adjust the variable observation point (e.g., a location of a virtual camera) depending on an observer position information (e.g., obtained via a user interface), e.g., so that the observation point is selectable or displaceable by the user along a curve in the virtual reality environment (e.g., along a curve along which the video reproduction areas or video reproduction spaces are arranged). Moreover, in this embodiment, the video conference apparatus is configured to adjust an observer viewing direction depending on the observer position information, e.g., so that the observer viewing direction that specifies a view direction in rendering is automatically adapted to an observer position.

In a preferred embodiment, the video conference apparatus is configured to adjust the observer viewing direction depending on the observer position information such that the observer viewing direction is perpendicular, with a tolerance of +/−10° to a direction along which the variable observation point moves, or such that the observer viewing direction is perpendicular, with a tolerance of +/−10°, to a curve along which the variable observation point moves.

It has been found that aligning the observer viewing direction to be substantially perpendicular to the direction or curve along with the variable observation point moves, provides for a pleasant user experience. Moreover, the described adaptation of the observer viewing direction allows to have a good view of videos of all video conference participants if the curve, along which the variable observation point moves, is a curve along with the video reproduction areas or video reproduction spaces are arranged. For example, a front view of the different video reproduction areas or video reproduction spaces (and consequently of the videos from the different video conference participants) can be provided with an efficient adjustment mechanism using such a concept. Thus, a good compromise between user-friendliness and user impression can be achieved.

In a preferred embodiment, the video conference apparatus is configured to adjust the observer viewing direction depending on the observer position information such that the observer viewing direction is always directed to an inside of a curve, e.g., of a closed curve or of a contour, e.g., of a circle or of an ellipse along which the variable observation point moves depending on the observer position. Alternatively, the observer viewing direction may always be directed (at least approximately) to a center of a curve (e.g. of a closed curve or of a contour; e.g., of a circle or of an ellipse) along which the variable observation point moves depending on the observer position information.

By directing the viewing direction always to the inside of the curve, or even (at least approximately) to the center of the curve, a view of an opposite-seated participant of the video conference can be rendered. Thus, it is achieved that the view of the other video conference participant may consistently provide the impression that the other video conference participant is sitting at an opposite side of a table. This is also considered as a pleasant impression, since it reflects many real-world meeting experiences.

Furthermore, by using such a concept, a sufficient distance between the observer position and the rendered video reproduction areas or video reproduction spaces is achieved, which brings along a good user impression.

In a preferred embodiment, the video conference apparatus is configured to adjust the observer viewing direction depending on the observer position information such that the observer viewing direction is directed to a video reproduction area opposite the variable observation point or to a video reproduction space opposite the variable observation point. Accordingly, a view on one or more opposite video reproduction spaces or video reproduction areas is provided, which allows to have a good view of one or more other video conference participants while keeping the user control of the actual observer position and observer viewing direction reasonably simple. In particular, it is not necessary for the user to separately adjust the observer viewing direction but they will, in contrast, be provided with an automatically adjusted advantageous observer viewing direction.

In a preferred embodiment, the video conference apparatus is configured to render acoustic signals (e.g., speech signals) from one or several video conference participants according to the arrangement of the video reproduction areas or video reproduction spaces (e.g., video tiles) associated with the video conference participants in the spatial (e.g., three-dimensional) virtual reality environment (e.g., such that the acoustic signals are rendered as originating from the locations of the respective video reproduction areas or video reproduction spaces).

Accordingly, a user will have a good hearing impression and the origin from which sounds of different video conference participants originate may, for example, correspond to directions in which the different video conference participants are viewed. In other words, the sounds of the different video conference participants may, for example, be rendered to originate from the locations at which the video reproduction areas or video reproduction spaces associated with said video conference participants are located. Consequently, a consistent perception of the speech of the other video conference participants and of the videos of the different video conference participants will be provided.

Another embodiment according to the invention creates a video conference method, wherein the method includes reproducing videos of a plurality of video conference participants on a plurality of video reproduction areas or in video reproduction spaces that are arranged in a spatial (three-dimensional) virtual reality environment.

This embodiment according to the invention is based on the same considerations as the above discussed video conference apparatus. By reproducing videos of a plurality of video conference participants on a plurality of video reproduction areas that are arranged in a spatial (three-dimensional) virtual reality environment or in video reproduction spaces that are arranged in a spatial (three-dimensional) virtual reality environment, a good user experience can be achieved. Moreover, it should be noted that the video conference method may optionally be supplemented by any of the features, functionalities and details disclosed herein, both individually and taken in combination.

Another embodiments according to the invention creates a computer program for performing the video conference method when the computer program is executed on a computer. The computer program is based on the same considerations like the above discussed video conference apparatus and the above discussed video conference method. The computer program may optionally be supplemented by any of the features, functionalities and details disclosed herein, both individually and taken in combination.

BRIEF DESCRIPTION OF THE FIGURES

Embodiments according to the present invention will subsequently be described taking reference to the enclosed figures in which.

DETAILED DESCRIPTION OF THE EMBODIMENTS

1. Video Conference Apparatus According to FIG. 1

Figure 1:
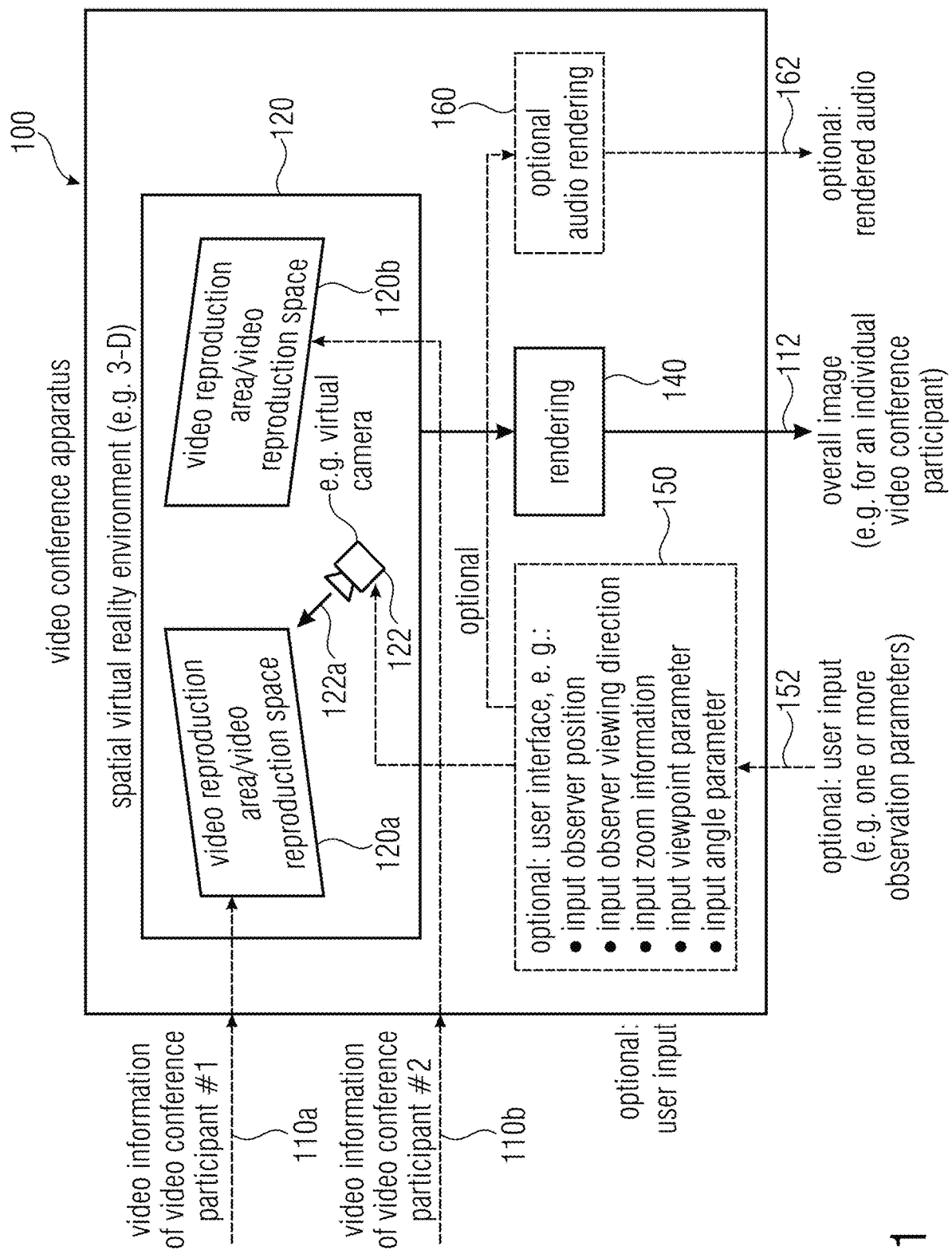
FIG. 1 shows a block schematic diagram of a video conference apparatus according to an embodiment of the present invention.

FIG. 1 shows a schematic representation of a video conference apparatus 100, according to an embodiment of the present invention.

The video conference apparatus 100 may, for example, receive video information 110*a*, 110*b* of a plurality of video conference participants and provide, on the basis thereof, a rendered overall image 112.

The video conference apparatus 100 is configured to reproduce videos of a plurality of video conference participants, which are, for example, described by the video information 110*a*, 110*b*, on a plurality of video reproduction areas that are arranged in a spatial (e.g., three-dimensional) virtual reality environment 120 or on (or in) a plurality of video reproduction spaces 120*a*, 120*b* that are arranged in a spatial (e.g., three-dimensional) virtual reality environment 120. For example, the video conference apparatus 100 may comprise (e.g. in a stored form) a description or definition of the spatial virtual reality environment 120. This definition of the spatial virtual reality environment may, for example, comprise a definition of locations of the video reproduction areas or video reproduction spaces 120*a*, 120*b*.

The video conference apparatus 100 may comprise a rendering 140, which is configured to render the spatial (e.g., three-dimensional) virtual reality environment 120 with the video reproduction areas or video reproduction spaces 120*a*, 120*b* (e.g., from the perspective of a virtual camera at a virtual camera position 122) to a "total image" or overall image 112 which may, for example, be intended for a certain video conference participant (or for an individual video conference participant or for a single video conference participant). For example, the rendering 140 may receive an information defining the spatial virtual reality environment, an information describing a position of the virtual camera 122 and an information describing a viewing direction of the virtual camera (wherein the information describing the position of the virtual camera may also be considered as an observer position, and wherein the viewing direction of the virtual camera may also be considered as an observer viewing direction).

Thus, the rendering 140 may generate an image (e.g., the overall image 112) of the virtual reality environment described in (or defined) by an appropriate information when seen from the perspective of the virtual camera 122. For example, the rendering 140 may use the video information 110*a*, 110*b* of the different video conference participants as a texture of a respective associated video reproduction area or as a texture in a respective associated video reproduction space. In other words, the video information 110 of the first conference participant may be displayed (or rendered) at the location of the first video reproduction area 120*a*, taking into consideration an orientation (or spatial alignment) of the first video reproduction area. Similarly, the video information 110*b* of the second video conference participant may be displayed (or rendered) at the place of the second video reproduction area 120*b*, taking into consideration the spatial orientation (or alignment) of the second video reproduction area 120*b*.

In other words, different spatial orientations of the different video reproduction areas 120*a*, 120*b* may be considered, which may, for example, include a consideration of a perspective deformation of the video reproduction areas 120*a*, 120*b*, and consequently of the video content rendered on the video reproduction areas 120*a*, 120*b*. Moreover, additional three-dimensional rendering effects, like a change of the size in dependence on the distance from the virtual camera, occlusion effects or shading effects may also be considered by the rendering 140. Thus, the rendering 140 may, for example, provide the overall image information 112 on the basis of the description (or definition) of the spatial virtual reality environment, on the basis of an information describing a position and viewing direction of the virtual camera (or, equivalently, of the observer) and also considering the video information 110*a*, 110*b* of different video conference participants. Consequently, the rendering 140 may provide the overall image such that the video information of different video conference participants is displayed on spatially arranged video reproduction carriers (or in spatially arranged video reproduction spaces), wherein the position and/or the viewing direction of the virtual camera (or of the observer) is adjustable.

Thus, the overall image typically reflects a view of the spatial virtual reality environment from a perspective that may be predefined in some embodiments but that may be adjustable under the control of a user in other embodiments. The overall image may be rendered in such a manner that it provides the impression that the (other) video conference participants, the images of which are displayed on the video reproduction areas 120*a*, 120*b*, appear to be placed in a three-dimensional (spatial) scene, for example with different orientations. For example, the overall image may provide the user with the impression that the other video conference participants are seated (or are standing) at different non-parallel positions, which may, for example, create the impression of a conference table (e.g. a round table) around which the other video conference participants are located. Thus, a pleasant user experience can be provided to a user of the video conference apparatus who may, for example, have the possibility to adjust the position and/or viewing direction of the virtual camera (i.e., an observation position or an observer viewing direction).

The (optional) user interface 150 may receive an (optional) user input 152 to adjust the observer position and/or the observer viewing direction 122*a* (which correspond to the position and/or orientation of the virtual camera 122) in accordance with the user input. Different types of user inputs may be received and may, for example, be processed by the user interface to derive the observer position and/or the observer viewing direction and/or the observer zoom factor from the user input.

Generally speaking, the user interface 150 may be adapted to make it as easy as possible for the user to choose an appropriate observation position and/or observation viewing direction which provides a good view of one or more other video conference participants (videos of which are displayed on the video reproduction areas and/or video reproduction spaces) and that fulfills his expectations. For example, the user interface may receive, as a user input, an observer position information, which may, for example, be a one-dimensional observer position information describing an observer position, e.g., along a line or along a closed contour. However, the observer position information could also be a two-dimensional or even three-dimensional information defining an observer position within the spatial virtual reality environment using two or three (e.g. 3D-adjustable) coordinates. Moreover, the observer position information may alternatively also be limited to a set of discrete values designating an observer position out of a predefined set of separate observer positions which may, for example, be spaced so far that they are recognized as separate observer positions.

Alternatively or in addition, an observer viewing direction information may be received via the user interface from a user, and may define the observer viewing direction (or, equivalently, the viewing direction of the virtual cameral 122).

In some embodiments, both an observer position information and an observer viewing direction information may be received via the user interface, to allow for an independent adjustment of the observer position and of the observer viewing direction. However, in other embodiments, only one out of the observer position information and the observer viewing direction information may be received from a user via the user interface, and the user interface 150 may, for example, derive the user observer position information from the observer viewing direction information, or vice versa. Thus, a specification of the observer viewing direction by the user may result in a determination of the observer position information by the user interface, or a definition of the observer position information by the user may result in a determination of the observer viewing direction by the user interface. Accordingly, a user may only need to set one of the two parameters (observer position, observer viewing direction), and the user interface 150 may automatically select the other parameter. This is particularly advantageous if, for example, the user position information is limited to a one-dimensional (scalar) value designating, for example, a position along a line or along a curve or along a (closed) contour. Alternatively, it may be advantageous to derive the observer position information from the observer viewing direction information if the observer viewing direction information to be input by the user is limited to a single scalar value defining, for example, an azimuth angle (while using a fixed elevation angle).

It should be noted that such one-dimensional (scalar) values can be input in a very easy manner via a user interface and that the usage of one-dimensional (scalar) values avoids the risk to overstrain the user, who should primarily concentrate onto the discussion within the conference, not onto the technical control of the video conference apparatus.

Alternatively or additionally, user interface may receive, from a user, a zoom information which describes whether the user wants to zoom in onto a video of a particular other video conference participant, or whether the user wants to zoom out, for example to see a broader view of the spatial virtual reality environment and/or to see videos of a plurality of video conference participants.

Moreover, it should be noted that the observer position information may, for example, be input in the form of a "viewpoint parameter" and that the observer viewing direction information may, for example, be input in the form of an "angle parameter".

To conclude, the observer position input via the user interface and/or the observer viewing direction input via the use interface and/or the zoom information input via the user interface may be used by the rendering 140 in order to provide the "overall image" 112 from a perspective defined by the observer position, the observer viewing direction and (optional) the zoom information.

Further (optional) details are described below.

Moreover, the video conference apparatus 100 optionally comprises an audio rendering 160. The audio rendering 160 may, for example, render audio signals associated with the video conference participants. For example the audio rendering 160 may perform the audio rendering based on the assumption that the respective audio signals originate from the positions where the videos associated with the video conference participants are displayed within the spatial virtual reality environment 120. Moreover, the audio rendering 160 may, for example, use information about the position and/or viewing direction of the observer (e.g. of the video conference participant for whom the total image and the audio content is rendered). Thus, the audio rendering 160 may, for example, render the audio signals associated with the other video conference participants based on a relative positioning between the video conference participant for which the total image and the audio signals are rendered and the other video conference participants.

Thus, the audio rendering 160 may, for example, render the audio signals of the other video conference participants in such a manner that the audio signals appear to originate from locations at which videos of the other video conference participants are displayed. Thus, the audio rendering 160 may serve to bring the visual perception of the other video conference participants and the acoustic perception of the speech of the other video conference participants in agreement.

Accordingly, the video conference apparatus 160 may optionally provide a rendered audio information 162, which may, for example, comprise one or more channel signals.

To conclude, the video conference apparatus 100 provides a significantly improved user experience when participating in a video conference, since videos of other video conference participants are shown in a three-dimensional scene (in the spatial virtual reality environment), which makes a perception of the video conference more realistic and helps to maintain a video conference participant's concentration.

2. Details Regarding the Spatial Virtual Reality Environment and the Adjustment of Observer Position, Observer Viewing Direction and Zoom Information In the following, some optional details regarding the spatial virtual reality environment and regarding an adjustment of the observer position, the observer viewing direction and the zoom information will be described. It should be noted that the details described in the following may optionally be introduced into any of the embodiments disclosed herein.

Figure 2:
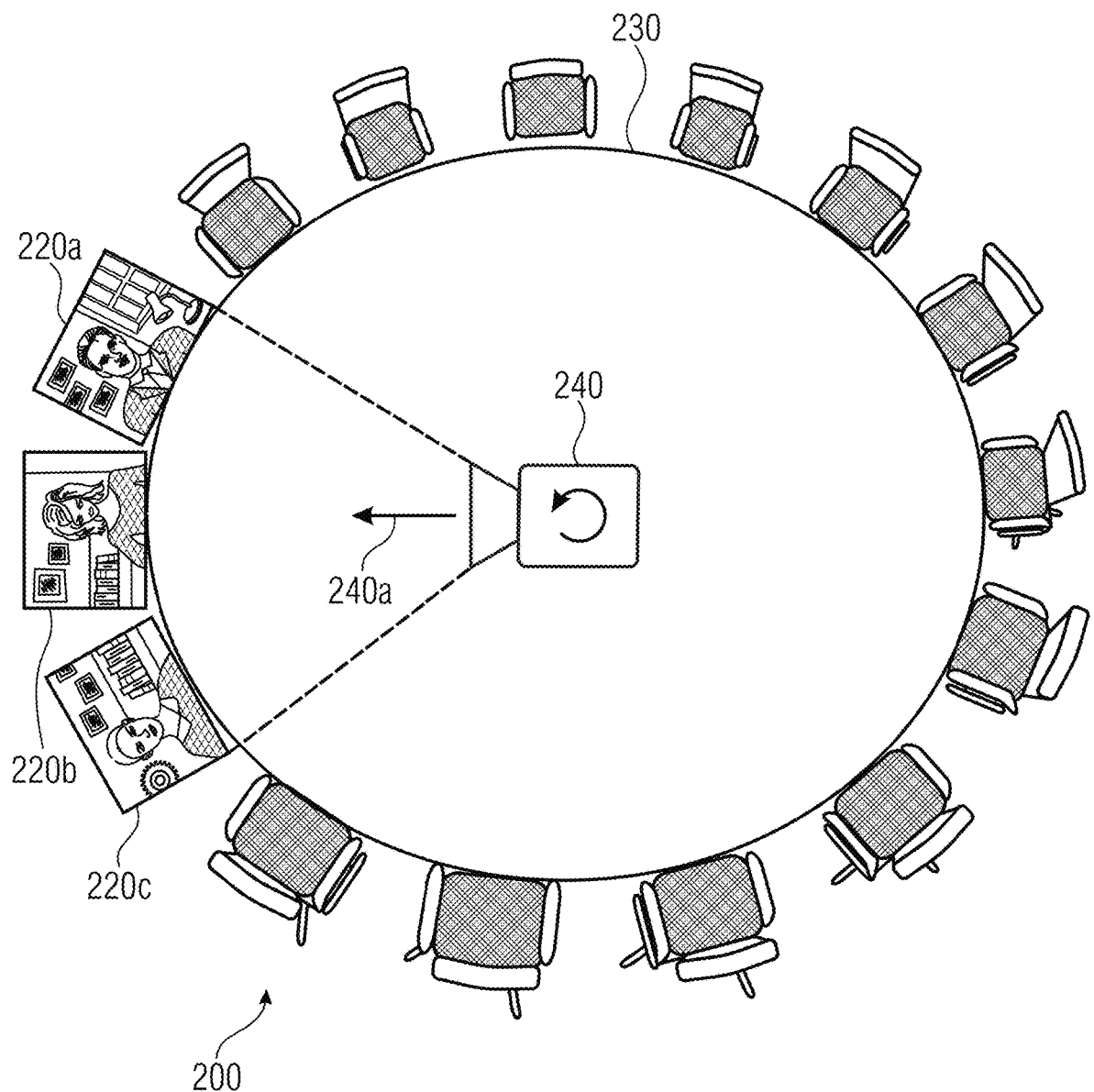
FIG. 2 shows a schematic representation of a spatial virtual reality environment, which can be used in the embodiments according to the present invention.

FIG. 2 shows a schematic representation of a (spatial) virtual reality environment 200. The virtual reality environment 200 comprises, for example, a "roundtable" scenario.

Seating positions are arranged around the round table. In other words, in the spatial virtual reality environment 200, video reproduction areas and/or video reproduction spaces may, for example, be arranged at seating positions around a round table (or around an oval table, or around a square table, or around a rectangular table, or around a table having any other shape, like a U-shape). For example, the video reproduction areas 220a, 220b, 220c, which may correspond to the video reproduction areas 120a, 120b, may be arranged around the table in such a manner that they can be seen from a camera position which may, for example, be located at a center of the table (e.g. with a tolerance of +/−20 of a maximum extension of the table or of a diameter of the table). In other words, the video reproduction areas or video reproduction spaces 220a, 220b, 220c are arranged along a contour, which may be defined by a circumference of the table 230. Thus, the contour along which the video reproduction areas 220a to 220c are arranged, may take the form of a circle, but may alternatively also take the form of an oval or of a square or of a rectangle, or of another geometric shape. Furthermore, it should be noted that the video reproduction areas 220a to 220c are located at user locations within the spatial virtual reality environment, wherein the user locations may, for example, be seat locations around the table 230. Just as an example, if the number of video conference participants is smaller than the number of chairs around the table 230, empty chairs may also be defined by the spatial virtual reality environment. Alternatively, a number of user locations and/or a size of the table may be adapted to a number of video conference participants (e.g., automatically).

In the example of FIG. 2, the observer position (or virtual camera position) 240 may, for example, be fixed, for example at a center of the table 230 or in an environment of the center of the table 230. Accordingly, it may not be necessary for a user to define the observer position (or virtual camera position), but rather it may be sufficient to define an observer viewing direction 240a (or virtual camera viewing direction). Using such a concept, a video conference participant, for whom the overall image is rendered, may have the possibility to have an equally good view of the videos of all video conference participants.

Figure 3:
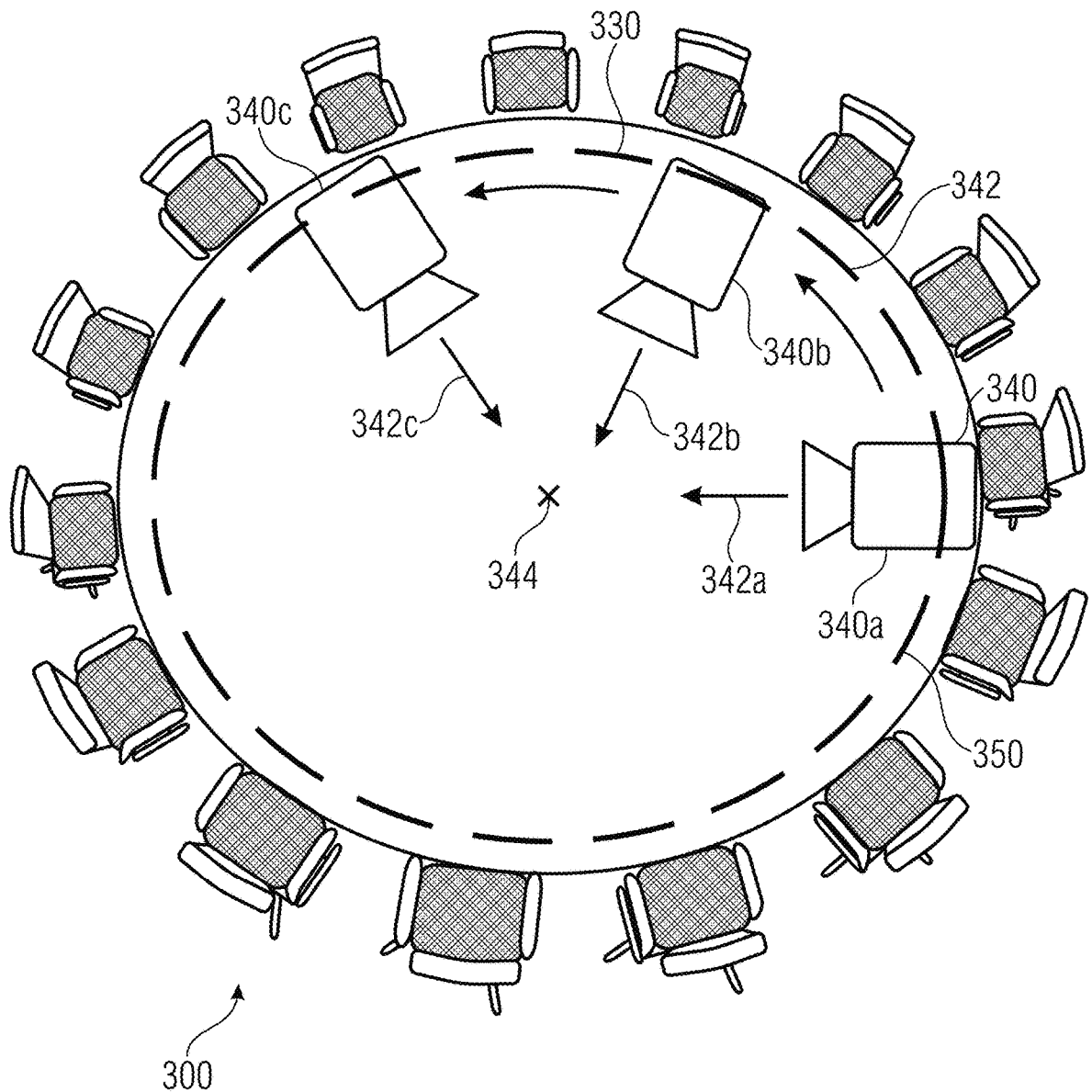
FIG. 3 shows a schematic representation of a spatial virtual reality environment, which can be used in the embodiments according to the present invention.

FIG. 3 shows a schematic representation of another spatial virtual reality environment 300, which may be used in the embodiments disclosed herein. Similar to the spatial virtual reality environment 200 according to FIG. 2, video reproduction areas (not shown in FIG. 3) may be arranged along an edge of a table (e.g., round table) 330, for example at seating positions (i.e. at user locations). The arrangement of the video reproduction areas in the spatial virtual reality environment 300 of FIG. 3 may, for example, be equal to the arrangement of the video reproduction areas in the spatial virtual reality environment 200 of FIG. 2.

However, a movement of the observation point (or of the virtual camera) may be different. For example, the virtual camera (or observation point) 340 may be movable along a line or contour or circle (or oval, or square, or rectangle) 342, for example, in accordance with a user input provided by a user interface. For example, a first position of the virtual camera is shown in reference numeral 340a, a second position of the virtual camera 340 is shown at reference numeral 340b, and a third position of the virtual camera 340 is shown at reference numeral 340c. A movement between the different positions 340a, 340b, 340c may, for example, be step-wise in comparatively large steps causing a significant change of the rendered total image or may be quasi-continuous (providing a fluent transition of the rendered total image). As can be seen, the virtual camera may, for example, move along a line (or a closed contour) 350 (e.g., along an edge of the table 330) along which the video reproduction areas may be arranged. Moreover, a viewing direction 342a,342b,342c of the virtual camera 340 may, for example, be adjusted automatically, to be directed towards a center 344 of the table or towards a center 344 of the contour 350 along which the virtual camera moves. For example, the viewing direction of the virtual camera 340 may be adapted, for example, by the user interface, such that the viewing direction of the virtual camera (which corresponds to an observer viewing direction) is perpendicular, within a tolerance of +/−10 degrees, to the direction along which the variable observation point moves, or such that the viewing direction of the virtual camera is perpendicular, with a tolerance of +/−10 degrees, to a curve 350 along which the virtual camera 340 (or the variable observation point) moves. The variable observation point (i.e., the location of the virtual camera) may be adjusted, for example, by the user interface 150, depending on observer position information, and the observer viewing direction (i.e., the viewing direction of the virtual camera) may be adjusted depending on the observer position information.

Consequently, the position and the viewing direction of the virtual camera 340 may, for example, be controlled either by an angle information (from which both the position of the virtual camera and the viewing direction of the virtual camera may be derived by the user interface) or by a linear position information (from which both the virtual camera position and the virtual camera viewing direction are derived by the user interface). Consequently, a very simple control of the virtual camera position and the virtual camera viewing direction is provided. In such an embodiment it can be achieved, in a very simple manner, that the observer viewing direction is always directed to an inside of a curve 350 (e.g., a closed curve or contour) along which the variable observation point moves depending on the observer position information. Alternatively, it can also be ensured, in a very simple manner, that the viewing direction is always directed to a center of a curve along which the variable observation point moves depending on the observer position information. Accordingly, the observer viewing direction may, for example, be directed towards a video reproduction area which is opposite of the variable observation point or towards a video reproduction space which is opposite of the variable observation point.

Consequently, a good user experience can be obtained.

Figure 4A:
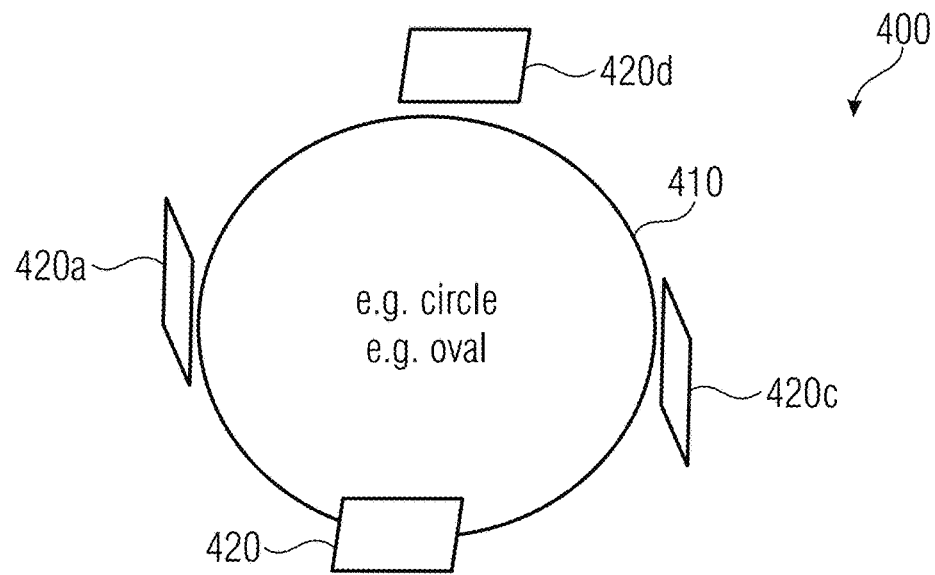
FIG. 4*a* shows a schematic representation of a spatial virtual reality environment, which can be used in the embodiments according to the present invention

FIG. 4a shows a schematic representation of a spatial virtual reality environment, which can be used in embodiments according to the present invention. As can be seen in FIG. 4, a plurality of video reproduction spaces 420a, 420b, 420c, 420d, which are used for displaying videos of different video conference participants, are arranged along a closed contour 410, which may take the shape of a circle or of an oval. It is apparent that surfaces of the video reproduction areas 420a to 420d are arranged in different directions in the spatial virtual reality environment 400. Consequently, perspective effects will be considered when rendering the spatial virtual reality environment when seen from the point of a virtual camera having an associated virtual camera viewing direction. Thus, videos of different video conference participants may be respectively distorted depending on a relation between the positions and orientations of the respective video reproduction area and of the virtual camera.

Figure 4B:
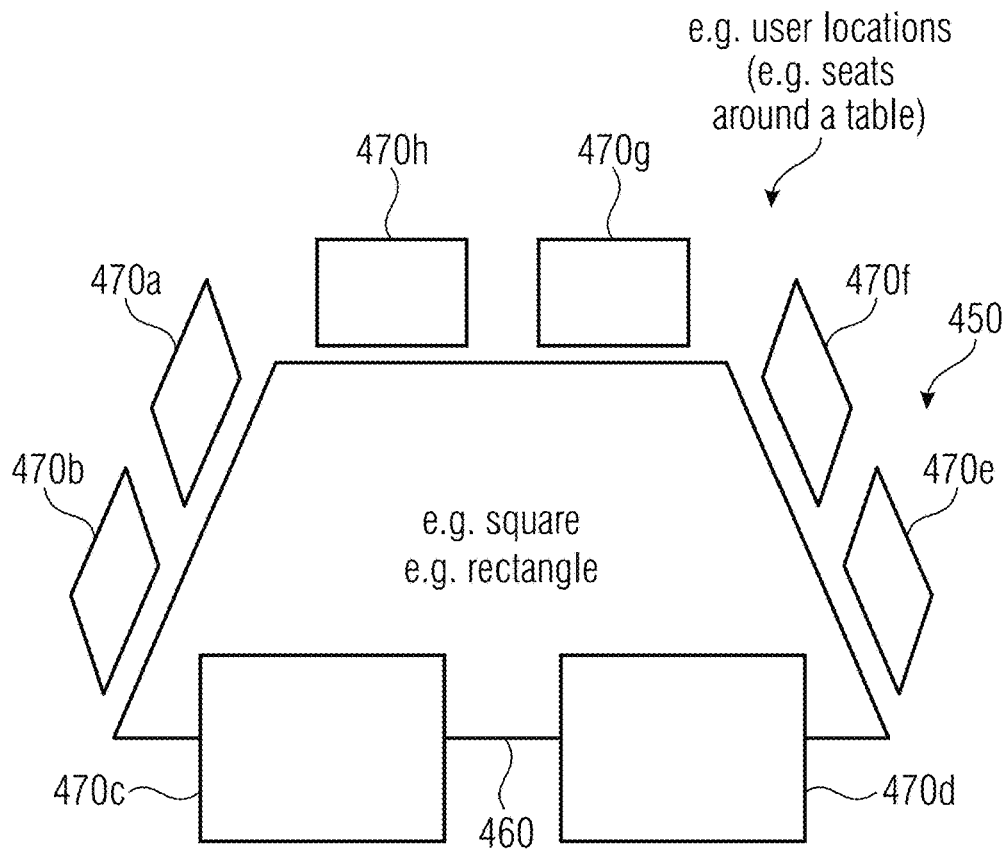
FIG. 4*b* shows a schematic representation of a spatial virtual reality environment, which can be used in the embodiments according to the present invention
Figure 5:
FIG. 5 shows a schematic representation of a conventional video conference application.
Figure 6:
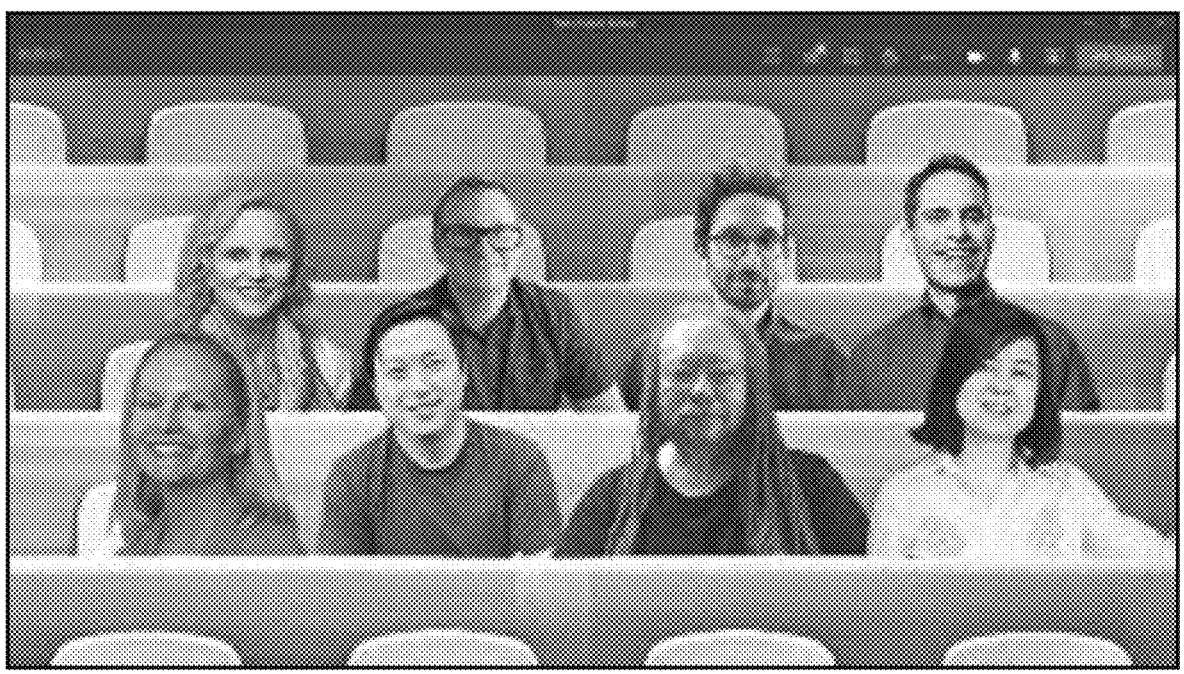
FIG. 6 shows a schematic representation of another conventional video conference application.

FIG. 4b shows a schematic representation of another spatial virtual reality environment 450, which can be used in embodiments according to the present invention. As can be seen, video reproduction areas 470a to 470h are arranged along a square or a rectangle 460, which may correspond to a circumference of a square or a rectangular table. A virtual camera position may, for example, be variable within an area around which the video reproduction areas are arranged. Thus, the spatial virtual reality environment 450 may, for example, correspond to a real-live conference situation in which conference participants are seated along the circumference of a table.

However, it should be noted that different spatial virtual reality environments are naturally also possible, in which the video reproduction areas may be arranged in a different manner, for example in an unregular manner or in a manner in which occlusion may occur.

To conclude, the spatial virtual reality environments 200, 300, 400, 450 may all be used in the embodiments of the invention and may be helpful to achieve a good user experience.

3. Further Aspects and Embodiments

According to an aspect of the present invention, an arrangement (or apparatus) is proposed, in which 360 degree virtual reality technologies are combined with video conference streams.

According to an aspect, this is particularly, interesting for so-called roundtable meetings. For this purpose, a virtual camera (e.g. the virtual camera 240) is positioned as a viewpoint in the middle of the round table (e.g the round table 230). The respective participant (for example, the video conference participant for which the total image is rendered) can then choose the viewing direction by himself, like in a 360 degree VR application (see, for example, https://ibc2020.digitalmedia.fraunhofer.de). Using the mouse (e.g. the computer mouse), one can move to the left and to the right, zoom in and zoom out and thereby place his attention (e.g. his visual attention) onto the respective conversational partner. The participants are shown (or overlaid) at a seat position (or at respective seat positions). The background can be designed as a virtual reality room.

An example is shown, for example, in FIG. 3.

A further development (or an alternative) is the possibility, to position the camera on a circular path or a differently shaped curved path (e.g. on the circle 350) in dependence on the 360 degrees viewing direction in the virtual reality room. A viewer may then, for example, "drive" along a curved path (e.g. using a user interface to control the position). This has the advantage that the camera can take a "natural" position on the opposite side of the table. The viewing angle (or perspective) and focal distance are, for example, adapted to the natural perception (e.g. automatically by the user interface).

In the following, some aspects according to the present invention will be described.

An embodiment according to the invention creates a combination of 360 degree virtual reality representations with video tiles (e.g. video reproduction areas) from video conference systems.

According to an aspect, a participant can by himself adjust viewpoint parameters (like rotational angle and/or zoom factor).

According to another aspect, in an extended variant the virtual camera is at a different virtual position in dependence on the rotational angle.

Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. Video conference apparatus (100),
    wherein the video conference apparatus is configured to reproduce videos (110*a*, 110*b*) of a plurality of video conference participants on a plurality of video reproduction areas (120*a*, 120*b*; 220*a*-220*c*; 420*a*-420*d*; 470*a*-470*h*) or video reproduction spaces that are arranged in a spatial virtual reality environment (120; 200;300;400;450), and
    wherein the video conference apparatus is configured to render the spatial virtual reality environment (120; 200;300;400;450) with the video reproduction areas (120*a*, 120*b*; 220*a*-220*c*; 420*a*-420*d*; 470*a*-470*h*) or video reproduction spaces to a total image (112) for a single video conference participant;
    wherein the video conference apparatus is configured to render the spatial virtual reality environment (120;200; 300;400;450) with the video reproduction areas (120*a*, 120*b*; 220*a*-220*c*; 420*a*-420*d*; 470*a*-470*h*) or the reproduction spaces viewed from a variable observation point (340*a*,340*b*,340*c*);
    wherein the video conference apparatus is configured to adjust the variable observation point (340*a*,340*b*,340*c*) depending on observer position information, and
    wherein the video conference apparatus is configured to adjust an observer viewing direction (342*a*,342*b*,342*c*) depending on the observer position information;
    wherein the video conference apparatus is configured to adjust the observer viewing direction (342*a*,342*b*,342*c*) depending on the observer position information such that
    the observer viewing direction (342*a*,342*b*,342*c*) is perpendicular, with a tolerance of +/−10 degrees, to a direction along which the variable observation point moves, or
    the observer viewing direction (342*a*,342*b*,342*c*) is perpendicular, with a tolerance of +/−10 degrees, to a curve (350;410;460) along which the variable observation point moves.

2. Video conference apparatus (100) according to claim 1,
    wherein the video reproduction areas (120*a*, 120*b*; 220*a*-220*c*; 420*a*-420*d*; 470*a*-470*h*) or video reproduction spaces are orientated differently.

3. Video conference apparatus (100) according to claim 1,
    wherein the video conference apparatus is configured to adjust an observer position depending on a user input, and
    to render the spatial virtual reality environment (120;200; 300;400;450) with the video reproduction areas (120*a*, 120*b*; 220*a*-220*c*; 420*a*-420*d*; 470*a*-470*h*) or video reproduction spaces depending on the observer position.

4. Video conference apparatus (100) according to claim 1,
    wherein the video conference apparatus is configured to adjust an observer viewing direction depending on a user input, and
    to render the spatial virtual reality environment (100;200; 300;400;450) with the video reproduction areas (120*a*, 120*b*; 220*a*-220*c*; 420*a*-420*d*; 470*a*-470*h*) or video reproduction spaces depending on the observer viewing direction.

5. Video conference apparatus (100) according to claim 1,
    wherein the video conference apparatus is configured to, depending on a user input, selectively render one or several video reproduction areas (120*a*, 120*b*; 220*a*-220*c*; 420*a*-420*d*; 470*a*-470*h*) or one or several video reproduction spaces that are each associated with other users.

6. Video conference apparatus (100) according to claim 1,
    wherein the video conference apparatus is configured to arrange the video reproduction areas (120*a*, 120*b*; 220*a*-220*c*; 420*a*-420*d*; 470*a*-470*h*) or video reproduction spaces along a contour (350;410;460).

7. Video conference apparatus (100) according to claim 1,
    wherein the video conference apparatus is configured to arrange the video reproduction areas (120*a*, 120*b*; 220*a*-220*c*; 420*a*-420*d*; 470*a*-470*h*) or video reproduction spaces along a circle (350;410) or along an oval or along a square (460) or along a rectangle.

8. Video conference apparatus (100) according to claim 1,
    wherein the video conference apparatus is configured to arrange the video reproduction areas (120*a*, 120*b*; 220*a*-220*c*; 420*a*-420*d*; 470*a*-470*h*) or video reproduction spaces at user locations in the spatial virtual reality environment (120;200;300;400;450).

9. Video conference apparatus (100) according to claim 1,
    wherein the video conference apparatus is configured to obtain one or several observation parameters (152), and to render the spatial virtual reality environment (120; 200;300;400;450) with the video reproduction areas (120*a*, 120*b*; 220*a*-220*c*; 420*a*-420*d*; 470*a*-470*h*) or video reproduction spaces depending on the one or several observation parameters.

10. Video conference apparatus (100) according to claim 1,
   wherein the observation parameters (152) include a rotation angle and/or a zoom factor.

11. Video conference apparatus (100) according to claim 1,
   wherein the video conference apparatus is configured to render, with an adjustable viewing direction and/or an adjustable zoom factor, the spatial virtual reality environment (120;200;300;400;450) with the video reproduction areas (120a, 120b; 220a-220c; 420a-420d; 470a-470h) or video reproduction spaces viewed from a predetermined observation point (240).

12. Video conference apparatus (100) according to claim 1,
   wherein the video conference apparatus is configured to adjust the variable observation point (340a,340b,340c) depending on observation information or depending on angle information.

13. Video conference apparatus (100) according to claim 12,
   wherein the video conference apparatus is configured to adjust the variable observation point (340a,340b,340c) depending on observation information or depending on angle information, such that the variable observation point (340a,340b,340c) is selectable or displaceable by the user along a curve (350;410;460) in the virtual reality environment (100;30;400;450).

14. Video conference apparatus (100) according to claim 1,
   wherein the video conference apparatus is configured to adjust the observer viewing direction (342a,342b,342c) depending on the observer position information such that
   the observer viewing direction (342a,342b,342c) is always directed to an inside of a curve (350;410;460) along which the variable observation point (342a,342b, 342c) moves depending on the observer position information, or
   the observer viewing direction (342a,342b,342c) is always directed to a center (344) of a curve (350;410; 460) along which the variable observation point (342a, 342b,342c) moves depending on the observer position information.

15. Video conference apparatus (100) according to claim 1,
   wherein the video conference apparatus is configured to adjust the observer viewing direction (342a,342b,342c) depending on the observer position information such that
   the observer viewing direction (342a,342b,342c) is directed to a video reproduction area (120a, 120b; 420a-420d; 470a-470h) opposite the variable observation point (340a,340b,340c) or to a video reproduction space opposite the variable observation point.

16. Video conference apparatus (100) according to claim 1,
   wherein the video conference apparatus is configured to render acoustic signals from one or several video conference participants according to the arrangement of the video reproduction areas (120a, 120b; 220a-220c; 420a-420d; 470a-470h) or video reproduction spaces associated with the video conference participants in the spatial virtual reality environment (120; 200;300;400;450).

17. Video conference method,
   wherein the method includes reproducing videos of a plurality of video conference participants on a plurality of video reproduction areas or in video reproduction spaces that are arranged in a spatial virtual reality environment;
   wherein the method comprises rendering the spatial virtual reality environment (120; 200;300;400;450) with the video reproduction areas (120a, 120b; 220a-220c; 420a-420d; 470a-470h) or video reproduction spaces to a total image (112) for a single video conference participant;
   wherein the spatial virtual reality environment (120;200; 300;400;450) with the video reproduction areas (120a, 120b; 220a-220c; 420a-420d; 470a-470h) or the reproduction spaces is rendered viewed from a variable observation point (340a,340b,340c);
   wherein the method comprises adjusting the variable observation point (340a,340b,340c) depending on observer position information, and
   wherein the observer viewing direction (342a,342b,342c) is adjusted depending on the observer position information;
   wherein the observer viewing direction (342a,342b,342c) is adjusted depending on the observer position information such that
   the observer viewing direction (342a,342b,342c) is perpendicular, with a tolerance of +/−10 degrees, to a direction along which the variable observation point moves, or
   the observer viewing direction (342a,342b,342c) is perpendicular, with a tolerance of +/−10 degrees, to a curve (350;410;460) along which the variable observation point moves.

18. A non-transitory digital storage medium having a computer program stored thereon to perform the method according to claim 17 when the computer program is executed on a computer.

19. Video conference apparatus (100),
   wherein the video conference apparatus is configured to reproduce videos (110a, 110b) of a plurality of video conference participants on a plurality of video reproduction areas (120a, 120b; 220a-220c; 420a-420d; 470a-470h) or video reproduction spaces that are arranged in a spatial virtual reality environment (120; 200;300;400;450), and
   wherein the video conference apparatus is configured to render the spatial virtual reality environment (120; 200;300;400;450) with the video reproduction areas (120a, 120b; 220a-220c; 420a-420d; 470a-470h) or video reproduction spaces to a total image (112) for a single video conference participant;
   wherein the video conference apparatus is configured to render the spatial virtual reality environment (120;200; 300;400;450) with the video reproduction areas (120a, 120b; 220a-220c; 420a-420d; 470a-470h) or the reproduction spaces viewed from a variable observation point (340a,340b,340c);
   wherein the video conference apparatus is configured to adjust the variable observation point (340a,340b,340c) depending on observer position information, and
   wherein the video conference apparatus is configured to adjust the variable observation point (340a,340b,340c) depending on a single one-dimensional movement parameter obtained from a user interface, such that the variable observation point (340a,340b,340c) is selectable or displaceable by the user via the user interface along a predefined curve (350;410;460) in the virtual reality environment (100;30;400;450), wherein the video conference apparatus is configured to adjust an observer viewing direction (342a,342b,342c) depending on the observer position information, to thereby jointly adjust the variable observation point and the observer viewing direction on the basis of the observer position information;

wherein the video conference apparatus is configured to adjust the observer viewing direction (342a,342b,342c) depending on the observer position information such that the observer viewing direction (342a,342b,342c) is perpendicular, with a tolerance of +/−10 degrees, to a direction along which the variable observation point moves, or the observer viewing direction (342a,342b,342c) is perpendicular, with a tolerance of +/−10 degrees, to a curve (350;410;460) along which the variable observation point moves; or wherein the video conference apparatus is configured to adjust the observer viewing direction (342a,342b,342c) depending on the observer position information such that the observer viewing direction (342a,342b,342c) is always directed to an inside of a curve (350;410;460) along which the variable observation point (342a,342b, 342c) moves depending on the observer position information, or the observer viewing direction (342a,342b,342c) is always directed to a center (344) of a curve (350;410; 460) along which the variable observation point (342a, 342b,342c) moves depending on the observer position information; or wherein the video conference apparatus is configured to adjust the observer viewing direction (342a,342b,342c) depending on the observer position information such that the observer viewing direction (342a,342b,342c) is directed to a video reproduction area (120a, 120b; 420a-420d; 470a-470h) opposite the variable observation point (340a,340b,340c) or to a video reproduction space opposite the variable observation point;

wherein the video conference apparatus is configured to render the spatial virtual reality environment so as to obtain a two-dimensional image of the spatial virtual reality environment with the video reproduction areas or video reproduction spaces from the perspective of an observer at the observation point with a view into the observer viewing direction.

20. Video conference apparatus (100), wherein the video conference apparatus is configured to reproduce videos (110a, 110b) of a plurality of video conference participants on a plurality of video reproduction areas (120a, 120b; 220a-220c; 420a-420d; 470a-470h) or video reproduction spaces that are arranged in a spatial virtual reality environment (120; 200;300;400;450), and wherein the video conference apparatus is configured to render the spatial virtual reality environment (120; 200;300;400;450) with the video reproduction areas (120a, 120b; 220a-220c; 420a-420d; 470a-470h) or video reproduction spaces to a total image (112) for a single video conference participant;

wherein the video conference apparatus is configured to render the spatial virtual reality environment (120;200; 300;400;450) with the video reproduction areas (120a, 120b; 220a-220c; 420a-420d; 470a-470h) or the reproduction spaces viewed from a variable observation point (340a,340b,340c) with a view into the observer viewing direction;

wherein the video conference apparatus is configured to adjust the variable observation point (340a,340b,340c) depending on a single one-dimensional movement parameter obtained from a user interface, such that the variable observation point (340a,340b,340c) is selectable or displaceable by the user via the user interface along a predefined curve (350;410;460) in the virtual reality environment (100;30;400;450) by varying the single one-dimensional movement parameter, which describes a position along the predefined curve, wherein the single one-dimensional movement parameter, which is input via the user interface, is sufficient to define both the variable observation point, which is movable along the predefined curve, and an observer viewing direction, wherein the video conference apparatus is configured to adjust the observer viewing direction (342a,342b,342c) depending on the single one-dimensional movement parameter, to thereby jointly adjust the variable observation point and the observer viewing direction on the basis of the single one-dimensional movement parameter;

wherein the video conference apparatus is configured to adjust the observer viewing direction (342a,342b,342c) depending on the observer position information such that the observer viewing direction (342a,342b,342c) is perpendicular, with a tolerance of +/−10 degrees, to a direction along which the variable observation point moves, or the observer viewing direction (342a,342b,342c) is perpendicular, with a tolerance of +/−10 degrees, to a curve (350;410;460) along which the variable observation point moves; or wherein the video conference apparatus is configured to adjust the observer viewing direction (342a,342b,342c) depending on the observer position information such that the observer viewing direction (342a,342b,342c) is always directed to an inside of a curve (350;410;460) along which the variable observation point (342a,342b, 342c) moves depending on the observer position information, or the observer viewing direction (342a,342b,342c) is always directed to a center (344) of a curve (350;410; 460) along which the variable observation point (342a, 342b,342c) moves depending on the observer position information; or wherein the video conference apparatus is configured to adjust the observer viewing direction (342a,342b,342c) depending on the observer position information such that the observer viewing direction (342a,342b,342c) is directed to a video reproduction area (120a, 120b; 420a-420d; 470a-470h) opposite the variable observation point (340a,340b,340c) or to a video reproduction space opposite the variable observation point;

wherein the video conference apparatus is configured to render the spatial virtual reality environment so as to obtain a two-dimensional image of the spatial virtual reality environment with the video reproduction areas or video reproduction spaces from the perspective of an observer at the observation point with a view into the observer viewing direction.

* * * * *